(12) United States Patent
Carron et al.

(10) Patent No.: US 7,866,021 B2
(45) Date of Patent: Jan. 11, 2011

(54) METHODS AND ASSEMBLIES FOR MANUFACTURING COMPONENTS

(75) Inventors: Chris John Carron, Bloomsdale, MO (US); Dennis Todd Mell, Farmington, MO (US)

(73) Assignee: JAC Property Holdings, LLC, Bloomsdale, MO (US)

( * ) Notice: Subject to any disclaimer, the term of this patent is extended or adjusted under 35 U.S.C. 154(b) by 1231 days.

(21) Appl. No.: 11/421,222

(22) Filed: May 31, 2006

(65) Prior Publication Data

US 2007/0283548 A1 Dec. 13, 2007

(51) Int. Cl.
*B23Q 17/00* (2006.01)
*B23P 19/00* (2006.01)
(52) U.S. Cl. ..................... 29/407.07; 29/821
(58) Field of Classification Search .................... 29/759, 29/760, 821, 281.1, 281.5, 428, 700, 721, 29/407.01, 407.07, 407.09
See application file for complete search history.

(56) References Cited

U.S. PATENT DOCUMENTS

| | | | |
|---|---|---|---|
| 3,883,994 A | 5/1975 | Dellinger | |
| 4,624,081 A | 11/1986 | Janutta | |
| 4,637,107 A | 1/1987 | Romeu | |
| 4,683,626 A | 8/1987 | Steiner | |
| 4,698,773 A | 10/1987 | Jeppsson | |
| 4,715,775 A | 12/1987 | Amino | |
| 4,787,049 A | 11/1988 | Hirata et al. | |
| 4,798,006 A | 1/1989 | Barnaby | |
| 4,890,371 A | 1/1990 | Camloh et al. | |
| 4,941,265 A | 7/1990 | Heiland | |
| 5,170,358 A | 12/1992 | Delio | |
| 5,197,527 A | 3/1993 | Namba et al. | |
| 5,249,896 A | 10/1993 | Namba et al. | |
| 5,375,318 A * | 12/1994 | Catalano | 29/762 |
| 5,383,861 A | 1/1995 | Hempel et al. | |
| 5,432,422 A | 7/1995 | Nagano et al. | |
| 5,453,933 A | 9/1995 | Wright et al. | |
| 5,538,373 A | 7/1996 | Kirkham | |
| 6,138,818 A | 10/2000 | Green | |
| 6,189,426 B1 | 2/2001 | Segalman et al. | |
| 2004/0167659 A1 | 8/2004 | Scherer | |

* cited by examiner

*Primary Examiner*—John C Hong
(74) *Attorney, Agent, or Firm*—Scott Paul, Esq.; Carey Rodriguez Greenberg Paul, LLP

(57) ABSTRACT

A machine assembly for manufacturing a component includes a frame, a first guide member mounted on the frame, and at least one component support configured to support the component. The at least one component support is coupled to the first guide member such that the component is supported below the first guide member when the component is supported by the at least one component support. The at least one component support is configured for movement along said first guide member. The assembly also includes a second guide member mounted on the frame, and at least one tool support coupled to the second guide member and configured to support a tool for one of inspecting and machining the component.

17 Claims, 9 Drawing Sheets

METHODS AND ASSEMBLIES FOR MANUFACTURING COMPONENTS

BACKGROUND OF THE INVENTION

This invention relates generally to manufacturing components, and more specifically to methods and assemblies for manufacturing components.

Accurate manufacturing of components may be a significant factor in determining both manufacturing timing and cost. For example, accurate manufacturing of a component may be a significant factor affecting an overall cost of an assembly including the component, as well as subsequent modifications, repairs, and inspections of the component. During manufacturing of some components, cooling fluid may be discharged toward the machining zone to facilitate cooling the component during machining and thereby avoid heat damage to the component. Cooling fluid may also facilitate cooling machine tools to thereby avoid heat damage thereto. Moreover, cooling fluid may facilitate removing debris, for example shavings from the component and/or a mixture of shavings and cooling fluid, from the manufacturing zone. In addition, for at least some known machining processes, components may be coupled to a fixture that is supported from below. As a result, debris from the machining process can collect on the fixture and the component. Such debris may get in the way of manufacturing tools trying to access the component for, for example, machining or inspection. Moreover, debris accumulated on the fixture may get in the way of a new component being coupled to the fixture for manufacture thereof. As a result, an accuracy of the manufacturing process performed on the component may be decreased, thereby possibly increasing a cost and time of manufacture. Moreover, such debris may increase an amount of maintenance required to keep the fixture clean for accurately locating components. Furthermore, debris collected on the fixture and/or other components of a machine manufacturing the component may damage the fixture and/or such other components, which may an amount of maintenance to the fixture and/or such other components to avoid damage thereto.

Additionally, some known manufacturing machines vibrate during operation thereof, for example, due to movement of components of the machine. For example, some known receptacles that feed components to the machine, sometimes referred to as "hoppers", vibrate to facilitate orientating the components. Vibration of machine components may sometimes be transmitted, for example through a frame of the machine, to tools that perform a manufacturing process on the component and/or fixtures that hold the component during the manufacturing process. Vibration of the tools and/or fixtures may decrease an accuracy of the manufacturing process, and thereby increase manufacturing time and cost.

BRIEF DESCRIPTION OF THE INVENTION

In one aspect, a machine assembly for manufacturing a component includes a frame, a first guide member mounted on the frame, and at least one component support configured to support the component. The at least one component support is coupled to the first guide member such that the component is supported below the first guide member when the component is supported by the at least one component support. The at least one component support is configured for movement along said first guide member. The assembly also includes a second guide member mounted on the frame, and at least one tool support coupled to the second guide member and configured to support a tool for one of inspecting and machining the component.

In another aspect, a method is provided for manufacturing a component using a machine assembly comprising a frame and first and second guide members mounted on the frame. The method includes coupling a component support to the first guide member, coupling the component to the component support such that the component is supported below the first guide member, coupling a tool support to the second guide member, coupling a tool to the tool support, and moving the component support along the first guide member to facilitate manufacturing the component.

In another aspect, a machine assembly for manufacturing a component includes a frame, at least one component support coupled to the frame and configured to support the component, at least one tool support coupled to the frame and configured to support a tool for one of inspecting and machining the component, and at least one isolator coupled between the frame and at least one of the at least one tool support and the at least one component support for vibrationally decoupling at least one of the at least one tool support and the at least one component support from the frame.

In another aspect, a machine assembly for manufacturing a component includes a frame, at least one component support coupled to the frame and configured to support the component, a support member mounted on the frame, at least one machining tool support coupled to the support member, at least one machining tool coupled to the at least one machining tool support, at least one inspection tool support coupled to the support member, and at least one inspection tool coupled to the at least one inspection tool support, wherein at least one of the at least one machining tool support, the at least one inspection tool support, and the at least one component support configured for movement to facilitate manufacturing the component.

In even another aspect, a machine assembly for manufacturing a component includes a frame, a first support member mounted on the frame, and at least one component support configured to support the component. The at least one component support is coupled to the first support member such that the component is supported below the first support member when the component is supported by the at least one component support. The assembly also includes a second support member mounted on the frame, and at least one tool support coupled to the second support member. The at least one tool support is configured for movement relative to the at least one component support along at least one axis of the second support member that is generally parallel with a support surface supporting the frame. The at least one tool support configured to support a tool for one of inspecting and machining the component.

DETAILED DESCRIPTION OF THE INVENTION

As used herein, the terms "manufacturing" and "manufacture" may include any process for shaping and/or evaluating a component, such as, but not limited to fabrication and/or inspection. As used herein the terms "machining," "machine," and "machined" may include any process used for shaping a component. For example, processes used for shaping a component may include, but are not limited to including, turning, planing, milling, grinding, finishing, polishing, and/or cutting. In addition, and for example, shaping processes may include, but are not limited to including, processes performed by a machine, a machine tool, and/or a human being. The above examples are intended as exemplary only, and thus are not intended to limit in any way the definition and/or meaning of the terms "machining," "machine," and "machined".

As used herein, the terms "inspection" and "inspecting" may include any inspection process. For example, inspection processes may include measurement by a machine, measurement by humans, visual inspection by a machine, and/or visual inspection by a human. The above examples are intended as exemplary only, and thus are not intended to limit in any way the definition and/or meaning of the terms "inspection" and "inspecting". In addition, as used herein the term "component" may include any object subject to a manufacturing process.

Figure 1:
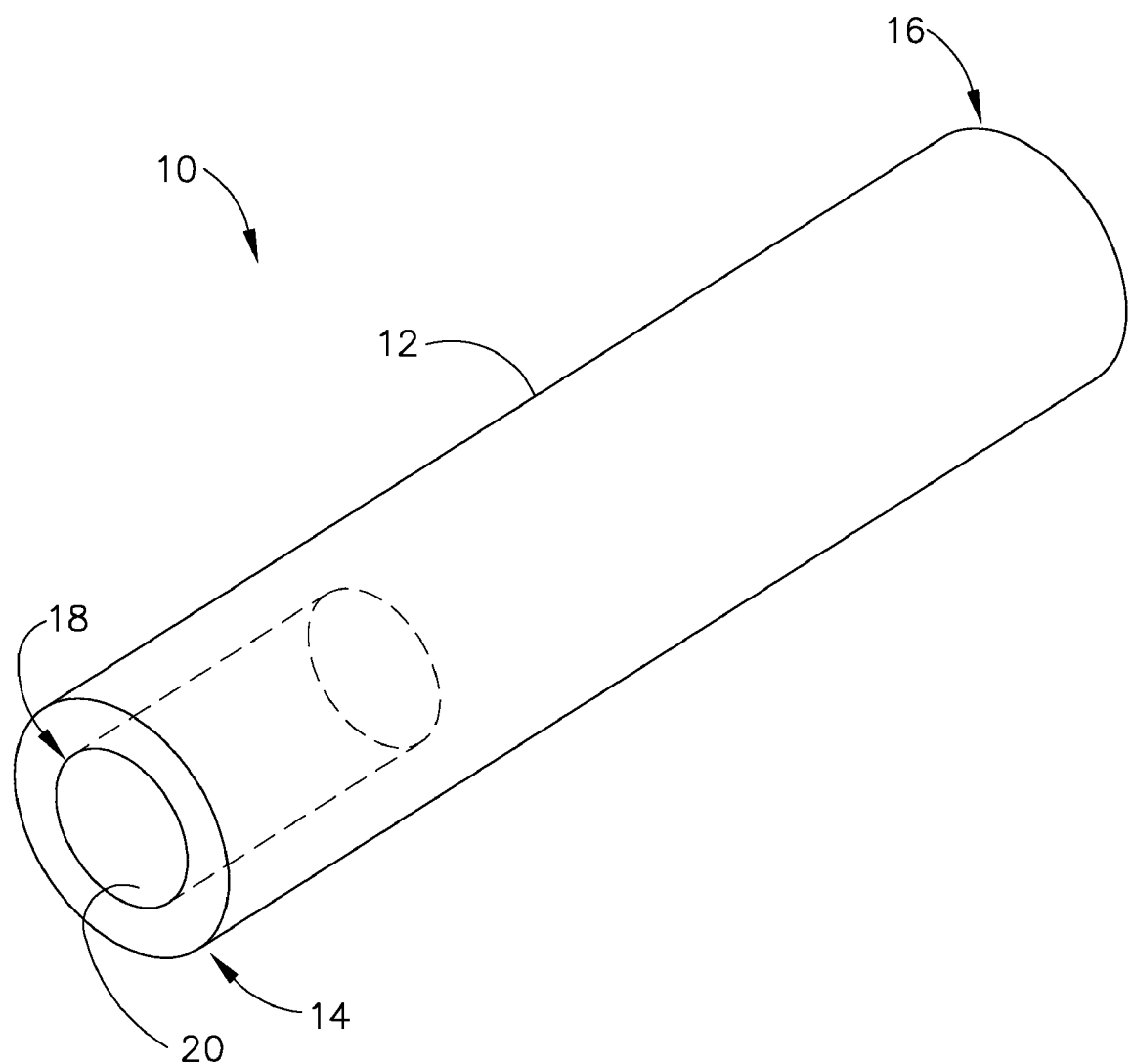
FIG. 1 is a perspective view of an exemplary component.

FIG. 1 is a perspective view of an exemplary component (generally designated by 10). In the exemplary embodiment, component 10 includes a generally cylindrical body 12 extending between two opposite end portions (generally designated by 14 and 16). Body 12 includes an opening (generally designated by 18) within end 14.

Figure 2:
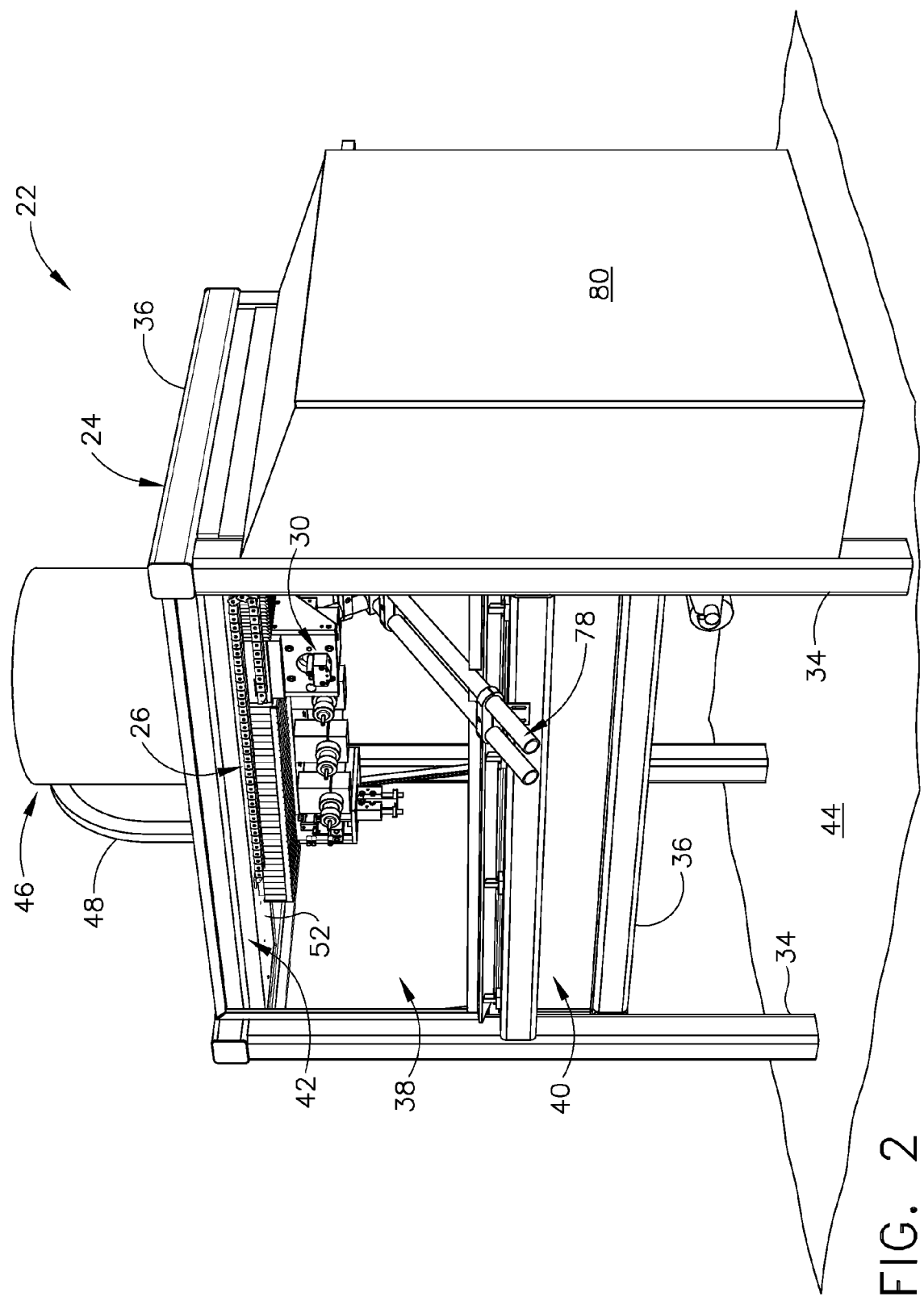
FIG. 2 is a perspective view of an exemplary embodiment of a machine assembly for use in manufacturing a component.
Figure 3:
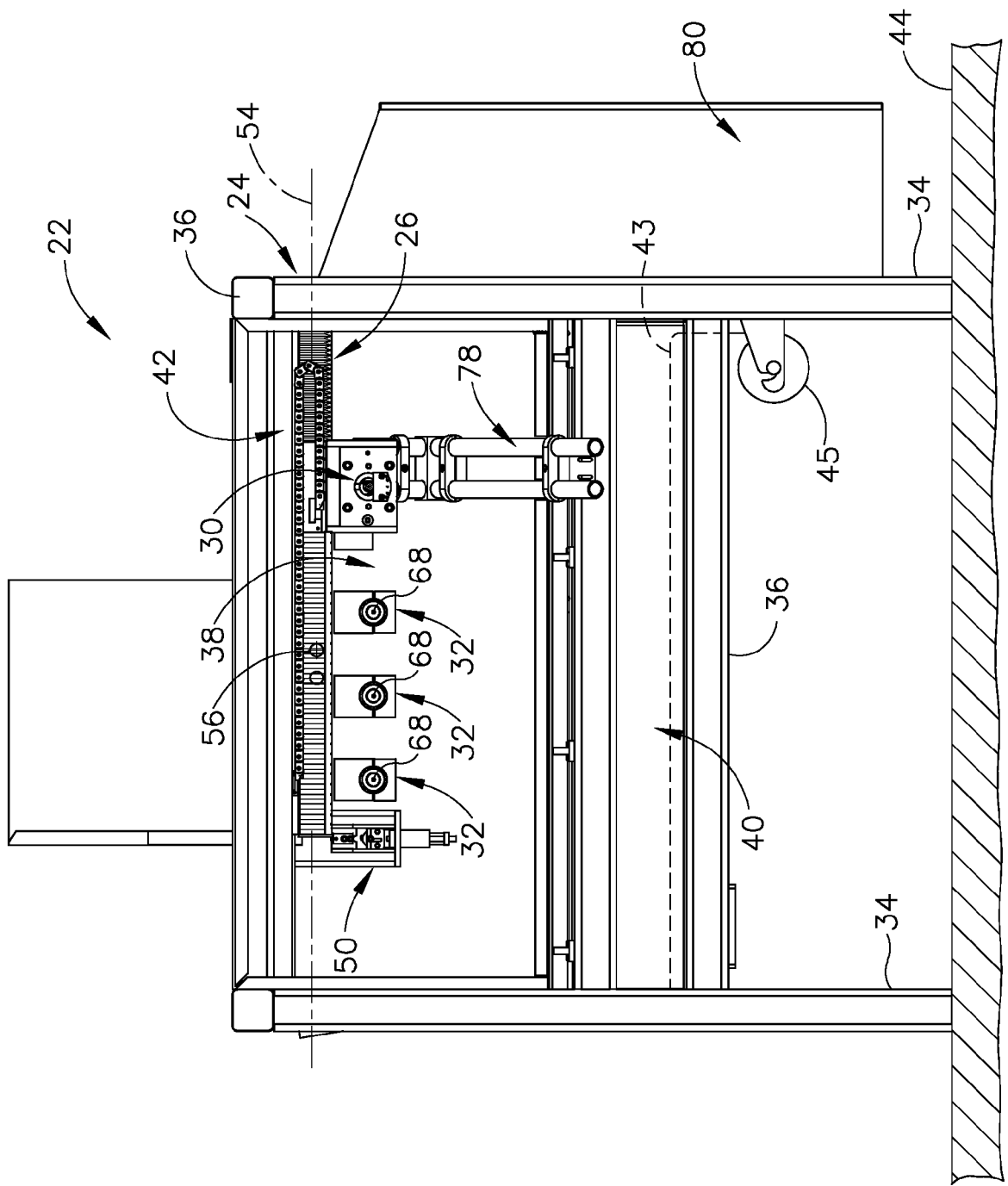
FIG. 3 is a side elevation view of the exemplary machine assembly shown in FIG. 2.
Figure 4:
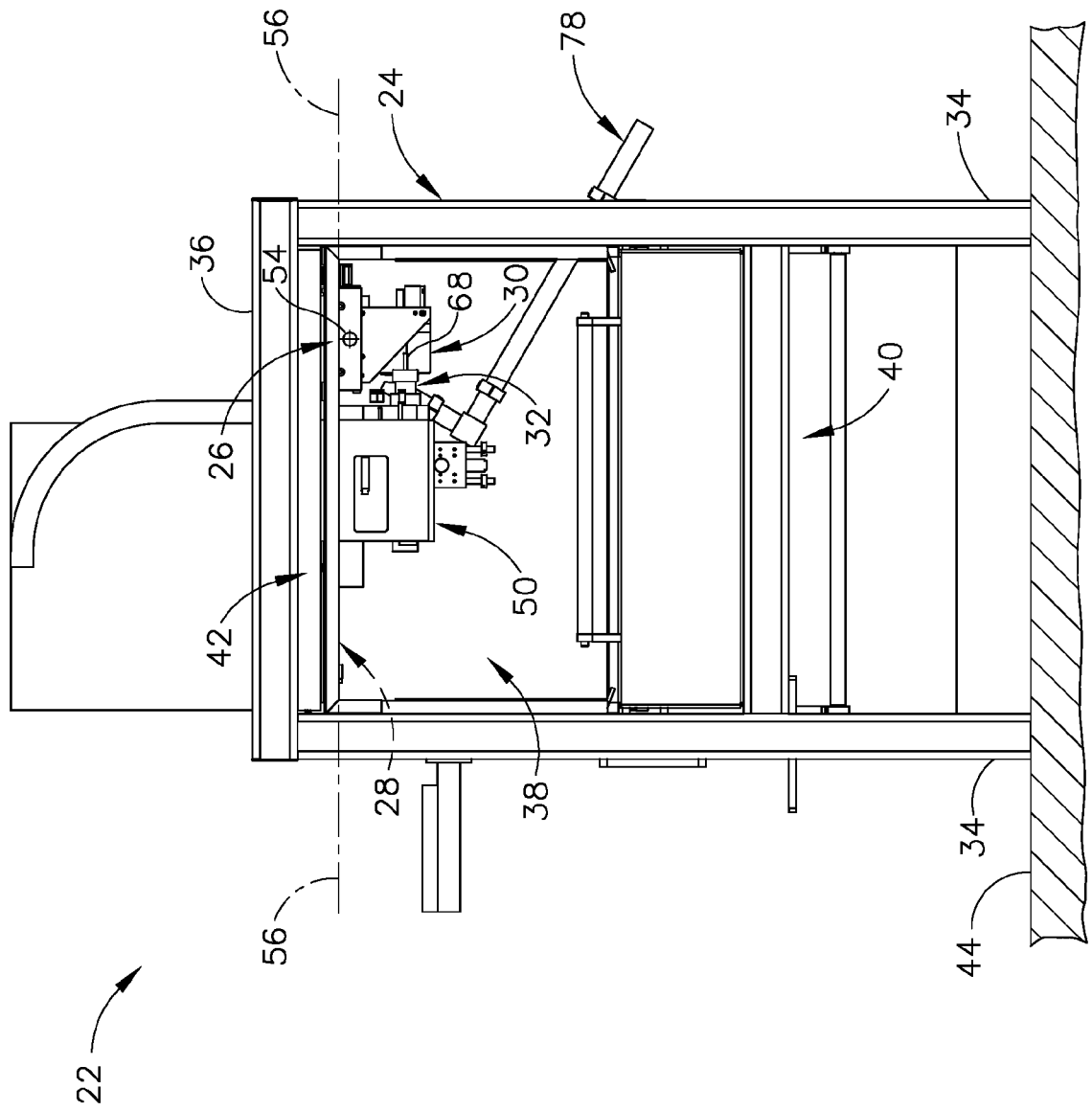
FIG. 4 is another side elevation view of the exemplary machine assembly shown in FIGS. 2 and 3.
Figure 5:
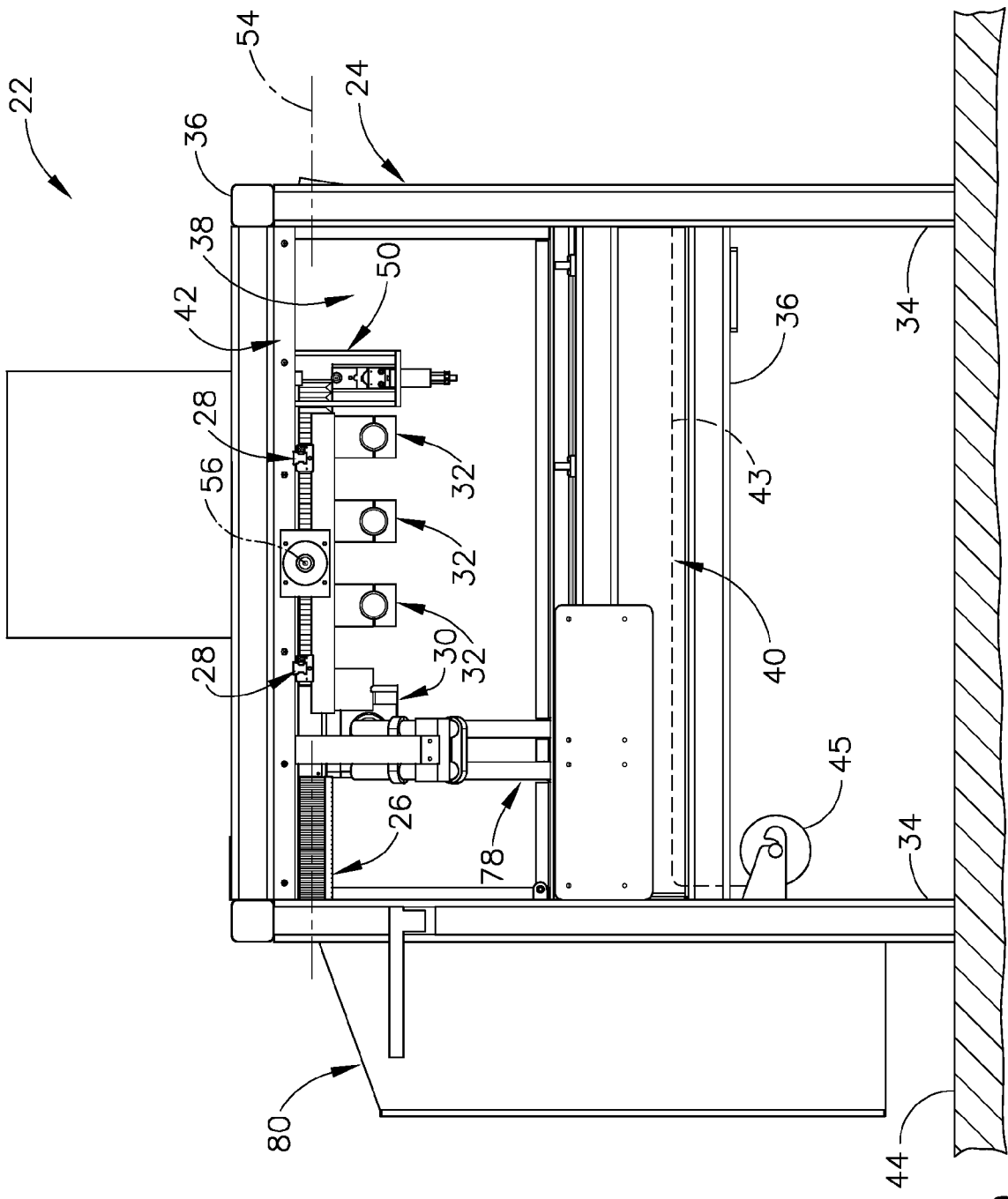
FIG. 5 is another side elevation view of the exemplary machine assembly shown in FIGS. 2-4.

FIG. 2 is a perspective view an exemplary embodiment of a machine assembly (designated in its entirety by reference numeral 22) for use in manufacturing a component. FIGS. 3-5 are side elevation views of machine assembly 22. Although machine assembly 22 may be used to manufacture any component, for example components of any operable shape, size, configuration, and/or material(s), in the exemplary embodiment machine assembly 22 is used in manufacturing component 10 (shown FIG. 1). Of course, it should be appreciated that the specific size, shape, configuration, and/or operation of machine assembly 22 described and/or illustrated herein is exemplary only. Accordingly, the specific size, shape, configuration, and/or operation of machine assembly 22 generally, as well as portions/components thereof, may be selected to accommodate other components than component 10.

Machine assembly 22 includes a frame (generally designated by 24), a guide, or support, member (generally designated by 26), one or more guide, or support, members (generally designated by 28), a component support (generally designated by 30), and one or more tool supports (generally designated by 32). In the exemplary embodiment, assembly 22 includes two guide members 28 and one guide member 26. However, assembly 22 may include any number of guide members 28 and may include any number of guide members 26. Generally, component support 30 is configured to support component 10 during a manufacturing process, and tool support 32 is configured to support a tool (not shown), such as, but not limited to, a machining or inspection tool, performing the manufacturing process on component 10. Any of guide member 26 and guide members 28 may be referred to herein as a first support member, a first guide member, a second support member, and/or a second guide member.

Frame 24 may include any structure, shape, arrangement, and/or configuration that enables frame 24 to function as described herein. In the exemplary embodiment, frame 24 includes a plurality of vertical and horizontal supports 34 and 36, respectively, coupled together as shown in FIGS. 2-5. An area of space defined between vertical and horizontal supports 34 and 36, respectively, defines a manufacturing area (generally designated by 38) of machine assembly 22. A bottom member (generally designated by 40) is coupled to frame 24 generally defining a bottom of manufacturing area 38 for, for example, containing and/or collecting debris from the manufacturing process, such as, but not limited to, cooling fluid and/or shavings machined from component 10. Similarly, a top member 42 coupled to frame 24 generally defines a top of manufacturing area 38. In some embodiments, top member 42 is vibrationally isolated, or vibrationally decoupled, from frame 24 to reduce vibration transmitted from portions/components of machine assembly 22 coupled to top member 42 from other portions/components of machine assembly 22. Top member 42 may be vibrationally isolated from frame 24 using any suitable structure and/or means, such as, but not limited to, rubber isolators. In some embodiments, one or more walls (not shown) extend between some or all of vertical supports 34 generally adjacent manufacturing area 38 to at least partially enclose manufacturing area 38 to, for example, contain debris within manufacturing area 38, protect people near machine assembly 22 from injury from components of assembly 22, and/or protect components of assembly 22 from damage. In some embodiments, one or more of the walls are at least partially transparent to allow viewing of manufacturing area 38 therethrough. Frame 24 is supported by a support surface 44, for example a shop floor.

As shown in FIGS. 3 and 5, in the exemplary embodiment a sheet of material 43 extends within manufacturing area 38 across at least a portion of bottom member 40 for collecting debris from the manufacturing process. Sheet 43 is fed into manufacturing area 38 from a roll 45 thereof mounted on frame 24. When sheet 43 has collected a predetermined amount of debris, sheet 43 can be unrolled to remove the portion of sheet 43 containing the debris and expose a different portion of sheet 43 across bottom member 40. In some embodiments, sheet 43 is at least partially porous such that sheet 43 allows at least some cooling fluid to pass while collecting, or filtering, debris from the cooling fluid.

Figure 6:
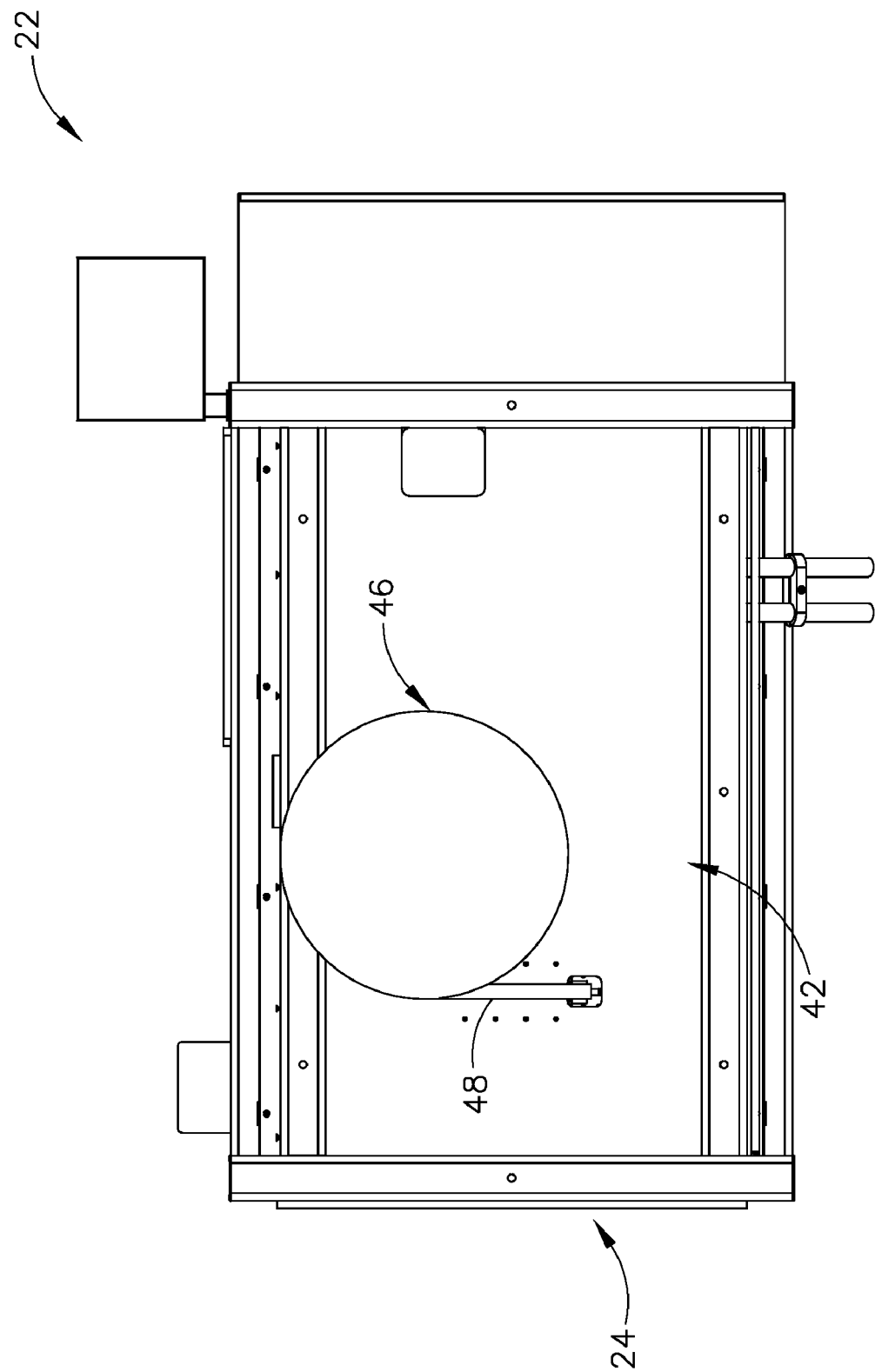
FIG. 6 is a top plan view of the exemplary machine assembly shown in FIGS. 2-5.

As shown in FIGS. 2 and 6, a feeder receptacle (generally designated by 46) is mounted on frame 24 for containing a plurality of components 10 and feeding components 10 to manufacturing area 38. In the exemplary embodiment, feeder receptacle 46 is sized, shaped, and configured to contain and feed a plurality of component 10 illustrated and described herein. It should be appreciated that the specific size, shape, configuration, and/or operation of feeder receptacle 46 generally, as well as portions/components thereof, may be selected to accommodate other components than component 10. Feeder receptacle 46 is coupled to a conduit 48 that extends through top member 42 into manufacturing area 38. Conduit 48 is coupled to a transfer assembly (generally designated by 50 and shown in FIGS. 3-5 and 8). Feeder receptacle 46 feeds components 10 through conduit 48 to transfer assembly 50, which transfers components 10 to component support 30 as will be described in more detail below. Feeder receptacle 46 may feed components 10 into conduit 48 and ultimately to transfer assembly 50 in any way, manner, fashion, and/or by any means. For example, in some embodiments feeder receptacle 46 includes a conveyor (not shown) for moving components 10 into conduit 48. Moreover, in some embodiments feeder receptacle 46 is configured to vibrate to facilitate moving components 10 into conduit 48. Feeder receptacle 46 may be vibrated using any structure and/or means. Facilitating the movement of components 10 using vibration is known in the art and therefore will not be described in more detail herein. Conduit 48 may move components 10 from feeder receptacle 46 to transfer assembly 50 in any way, manner, fashion, and/or using any means. For example, in some embodiments components 10 are gravity-fed through conduit 48. Moreover, in some embodiments, and for example, conduit 48 includes a conveyor (not shown) for moving components 10 therethrough.

Referring to FIGS. 2-5, guide members 26 and 28 are mounted on frame 24. Guide members 26 and 28 may be mounted on frame 24 in any manner, by any means, and/or in any location enabling guide members 26 and 28 to function as described herein. In the exemplary embodiment, guide members 26 and 28 are each mounted on a lower surface 52 of top member 42. As discussed above, in some embodiments top member 42 is vibrationally isolated from frame 24. As such, the vibrational isolation between top member 42 and frame 24 may facilitate reducing vibrations transmitted from portions/components of machine assembly 22 to guide members 26 and/or 28, and therefore, for example, to component support 30 and/or tool support 32. Reducing vibrations transmitted to guide members 26 and/or 28, component support 30, and/or tool support 32 may facilitate increasing an accuracy of manufacture of component(s) 10. Although guide members 26 and 28 may be mounted on frame 24 in any orientation relative to each other and to frame 24, in the exemplary embodiment guide members 26 and 28 are mounted on frame 24 such that a central longitudinal axis 54 of guide member 26 is generally perpendicular to a central longitudinal axis 56 of guide members 28. Moreover, in the exemplary embodiment central longitudinal axes 54 and 56 are generally parallel with support surface 44.

Figure 7:
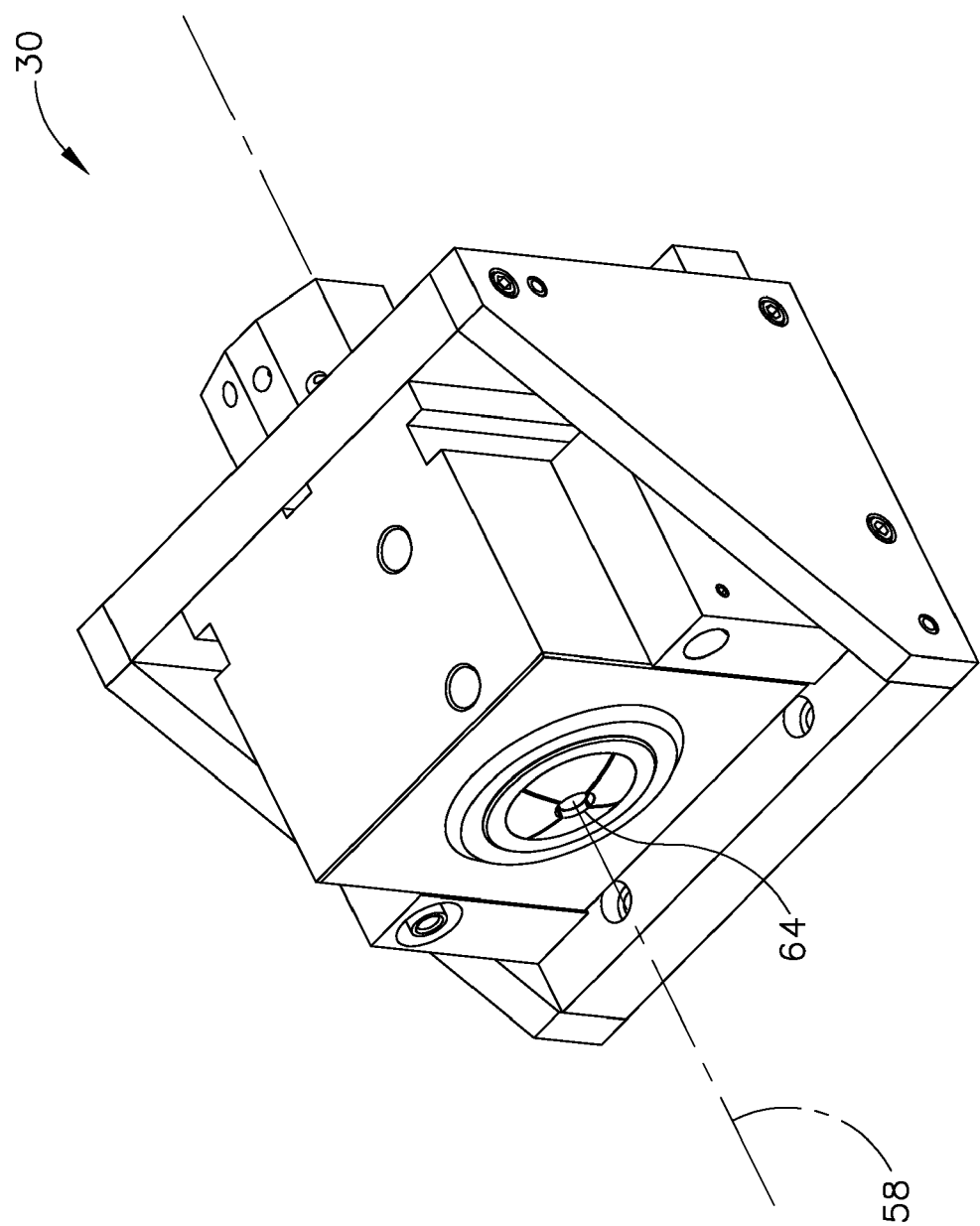
FIG. 7 is a perspective view of an exemplary embodiment of a component support of the exemplary machine assembly shown in FIGS. 2-6.

FIG. 7 is a perspective view of an exemplary embodiment of component support 30. In the exemplary embodiment, component support 30 is sized, shaped, and configured to support component 10 during a manufacturing process. Of course, it should be appreciated that the specific size, shape, configuration, and/or operation of component support 30 may be selected to accommodate components other than component 10. Component support 30 may support component 10 in any way, manner, fashion, and using any means. In the exemplary embodiment, component support 30 includes an opening 64 sized and shaped to receive component 10 therein and a plurality of jaws (not shown) that surround component 10 and move radially inward to fixedly secure component 10 within opening 64 during the manufacturing process.

Referring to FIGS. 1-5 and 7, component support 30 is coupled to guide member 26 such that component 10 is supported by component support 30 in an inverted position, and more specifically below guide member 26. Moreover, component support 30 is coupled to guide member 26 for movement relative thereto. Although component support 30 may move in any general direction relative to frame 24, tool support 32, and/or guide member 26, in the exemplary embodiment component support 30 moves along a length of guide member 26. Specifically, in the exemplary embodiment component support 30 moves along central longitudinal axis 54 of guide member 26 such that component support 30 moves along an axis generally perpendicular to central longitudinal axis 56 of guide members 28 and generally parallel to support surface 44. In some embodiments, and for example, component support 30 moves along axis 56 of guide members 28 and/or one or more axes that are generally parallel to axis 56. Moreover, in some embodiments component support 30 is configured to rotate component 10 about an axis to facilitate performing one or more manufacturing processes on component 10.

Component support 30 may be coupled to guide member 26 for movement relative thereto using any structure and/or means that enables component support 30 to function as described herein. In the exemplary embodiment, component support 30 is coupled to guide member 26 using a track (not shown). In addition or alternative to the track, in some embodiments component support 30 is coupled to guide member 26 using rollers (not shown). Movement of component support 30 along guide member 26 may be driven by any suitable structure and/or means, such as, but not limited to, hydraulic, pneumatic, and/or electrical power. Moreover, component support 30 may rotate component 10 using any structure and/or means, such as, but not limited to, hydraulic, pneumatic, and/or electrical power.

Figure 8:
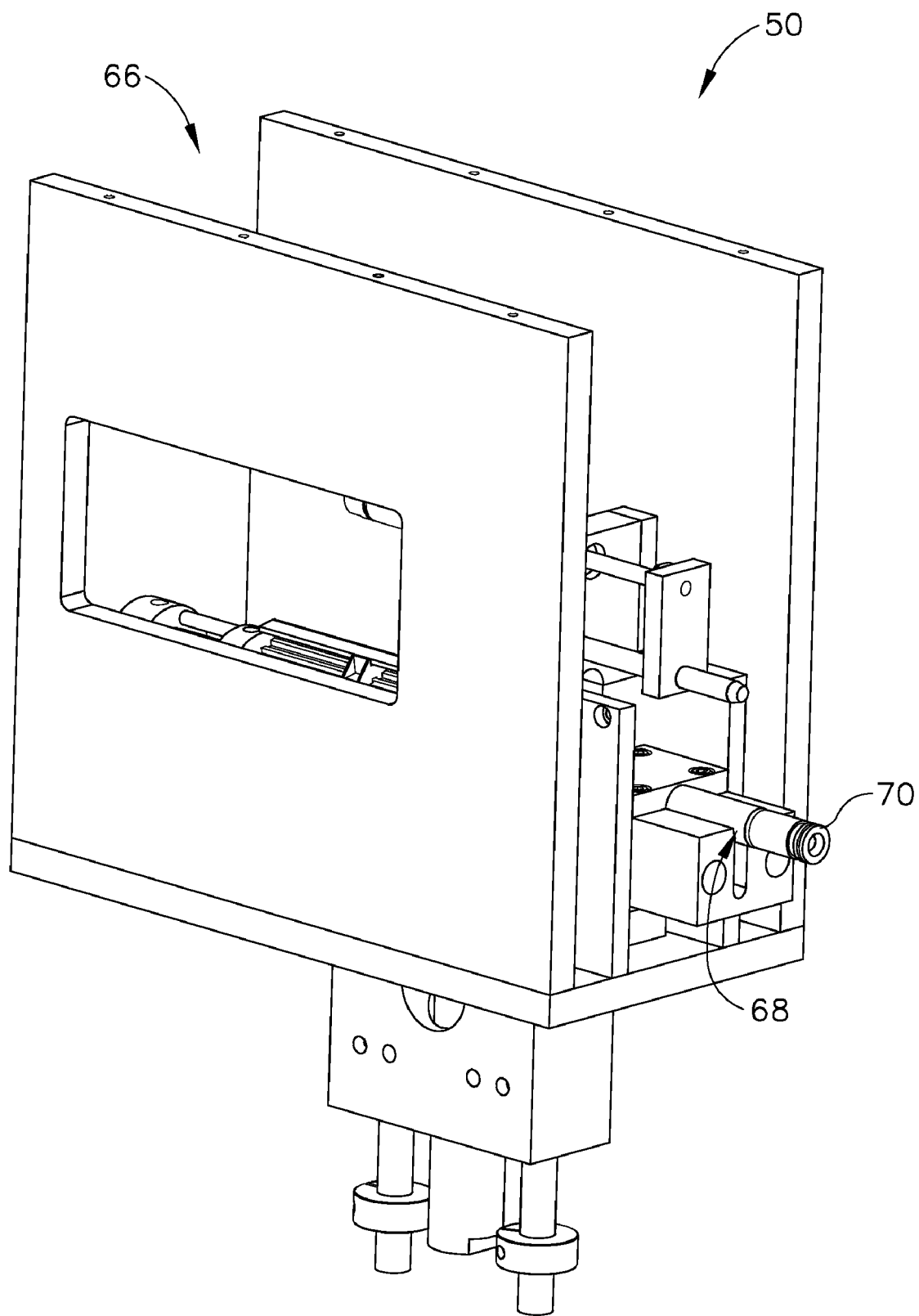
FIG. 8 is a perspective view of an exemplary embodiment of a transfer assembly of the exemplary machine assembly shown in FIGS. 2-6.

FIG. 8 is a perspective view of transfer assembly 50. Transfer assembly 50 includes an opening 66 in communication with conduit 48 for receiving component 10 therefrom. An opening 68 can be aligned with opening 64 (FIG. 7) of component support 30, for example via movement of component support 30 along guide member 26, to transfer component 10 from opening 68 to component support opening 64. Component 10 may be moved from transfer assembly opening 68 to component support opening 64 using any means. In the exemplary embodiment, transfer assembly 50 receives a stack of a plurality of components 10 from conduit 48 and isolates a single component 10. A pin 70 pushes the component 10 from transfer assembly 50 through opening 68 and into component support opening 64. Movement of pin 70 may be driven by any suitable structure and/or means, such as, but not limited to, hydraulic, pneumatic, and/or electrical power.

Transfer assembly 50 may be mounted on frame 24 in any manner, by any means, and/or in any location enabling transfer assembly 50 to function as described herein. In the exemplary embodiment, transfer assembly 50 is mounted on lower surface 52 of top member 42. As discussed above, in some embodiments top member 42 is vibrationally isolated from frame 24. As such, the vibrational isolation between top member 42 and frame 24 may facilitate reducing vibrations transmitted from portions/components of machine assembly 22 to transfer assembly 50, which may facilitate increasing an accuracy of isolation and/or transfer of components 10.

Figure 9:
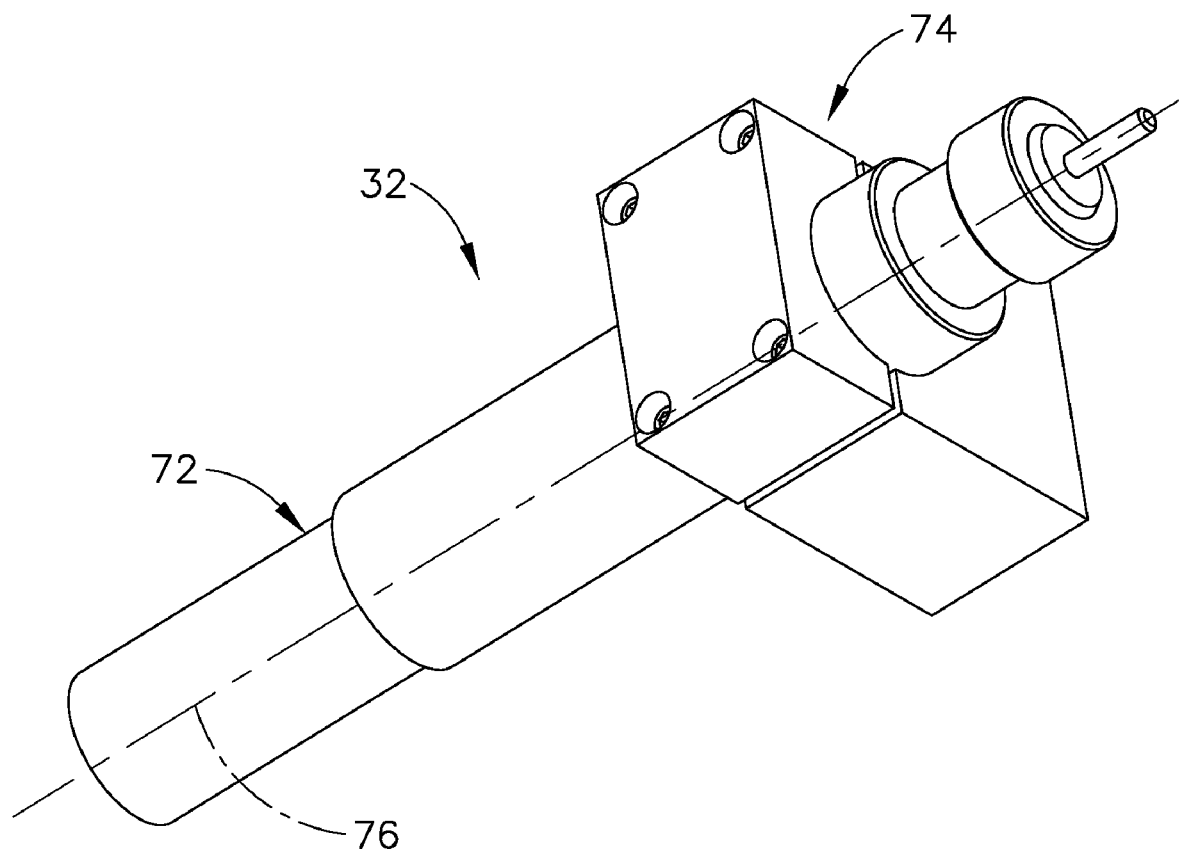
FIG. 9 is a perspective view of an exemplary embodiment of a tool support of the exemplary machine assembly shown in FIGS. 2-6.

Referring to FIGS. 2-5, guide members 28 include a plurality of tool supports 32 coupled thereto. Although three tool supports 32 are illustrated, any number of tool supports may be coupled to guide members 28. FIG. 9 is a perspective view of an exemplary embodiment of a tool support 32. Referring to FIGS. 1 and 9, tool supports 32 may each include one or more tools (generally designated by 72) coupled thereto for performing one or more manufacturing processes, although in the exemplary embodiment each tool support includes only one tool 68 coupled thereto. Tools 72 may be any manufacturing tool, such as, but not limited to, any machining tool and any inspection tool. In the exemplary embodiment, one of tool supports 32 includes a drill (not shown) for at least partially forming component opening 18, one of tool supports 32 includes a burnishing tool (not shown) for polishing an interior surface 20 of component opening 18, and one of tool supports 32 includes an inspection tool (not shown) for inspecting a diameter of component opening 18. Tool supports 32 may support tools 72 in any way, manner, fashion, and using any means. In the exemplary embodiment, tool supports 32 include a clamp (generally designated by 74) that securely holds tool 72 and that is coupled to guide members 28 for movement relative thereto. Operation of tools 72 may be driven by any suitable means, such as, but not limited to, hydraulic, pneumatic, and/or electrical power. In some embodiments, one or more tools 72 is configured to rotate about an axis 76 to facilitate performing one or more manufacturing processes on component 10. Rotation of one or more tools 72 may be driven by any structure and/or means, such as, but not limited to, hydraulic, pneumatic, and/or electrical power.

Referring to FIGS. 2-5 and 9, tool supports 32 are coupled to guide members 28 such that tools 72 are supported by tool supports 32 in an inverted position, and more specifically below guide members 28. Moreover, tool supports 32 are coupled to guide members 28 for movement relative thereto. In some embodiments, each of tool supports 32 is separately coupled to guide members 28 for independent movement relative thereto. In the exemplary embodiment, tool supports 32 are commonly coupled to guide members 28 such that tool supports 32 move with each other relative to guide members 28. Although tool support 32 may move in any general direction relative to frame 24, component support 30, axis 54, surface 44, guide members 28, and/or any the components of machine assembly 22, in the exemplary embodiment tool support 32 moves along a length of guide members 28. Specifically, in the exemplary embodiment tool support 32 moves along central longitudinal axis 56 of guide members 28 such that tool support 32 moves along an axis generally perpendicular to central longitudinal axis 54 of guide members 26 and generally parallel to support surface 44. Tool support 32 may be coupled to guide members 28 for movement relative thereto using any means that enables tool support 32 to function as described herein. In some embodiments, tool support 32 is coupled to guide members 28 using a track (not shown). In addition or alternative to the track, in some embodiments tool support 32 is coupled to guide members 28 using rollers (not shown). Movement of tool support 32 along guide member 28 may be driven by any suitable means, such as, but not limited to, hydraulic, pneumatic, and/or electrical power.

Referring to FIGS. 2-5, in operation, a component 10 contained within feeder receptacle 44 is fed through conduit 48 to transfer assembly 50. Component support 30 moves along guide member 26 until component support opening 64 is aligned with transfer assembly opening 68. Transfer assembly 50 then transfers component 10 to component support 30. Component support 30 moves along guide member 26 until component support opening 64 is aligned with a tool 72 coupled to a tool support 32. Tool support 32 then moves along guide members 28 towards component support 30 and component 10. In some embodiments, in addition or alternative to movement of tool support 32 along guide members 28, component support 30 moves along axis 56 of guide members 28 and/or one or more axes that are generally parallel to axis 56. Tool 72 then performs a manufacturing process on component 10. Component support 30 may then be moved along guide member 26 to align with other tools 72 for performing other manufacturing processes. In the exemplary embodiment, component support 30 aligns with a first of tools 72 that is a drill that at least partially forms component opening 18. Component support 30, in the exemplary embodiment, then moves along guide member 26 to align with another of tools 72 that is a burnishing tool that polishes component opening surface 20. Thereafter, in the exemplary embodiment, component support 30 moves along guide member 26 to align with another of tools 72 that is an inspection tool that inspects a diameter of component opening 18. Once the manufacturing processes are complete, and for example, component support 30 moves along guide member 26 towards an exit conduit (generally designated by 78) and releases component 10 into exit conduit 78 to remove the manufactured component 10 from manufacturing area 38.

A control system (generally 80) having one or more processors (not shown) and one or more sensors (not shown) is operatively connected to machine assembly 22 and its various components to generally control operation of machine assembly 22, as is generally known in the art. In some embodiments, control system 80 controls a frequency of inspection of components 10 based on trend data from a plurality of components 10 manufactured by machine assembly 22. Moreover, in some embodiments, control system 80 may change a manufacturing process based on the trend data.

The above-described machine assembly may facilitate reducing manufacturing time and cost, as well as increasing manufacturing accuracy. For example, supporting component 10 and tools 72 below guide members 26 and 28, respectively, may facilitate reducing an amount of machining debris that collects on component 10, component support 30, tool supports 32, and/or tools 72. Rather, at least some of such machining debris may fall onto machine assembly bottom member 40 and/or sheet 43. As a result, machine assembly 22 may facilitate increasing an accuracy of manufacturing component 10, decreasing a time and/or cost of manufacturing component 10, and/or decreasing an amount of maintenance performed on machine assembly 22 and its various components. Moreover, the above-described machine assembly 22 may facilitate increasing an accuracy of manufacturing component 10 by facilitating vibrationally isolating tools 68 and/or component 10 from vibrations transmitted through machine assembly frame 24.

Although the assemblies and methods described and/or illustrated herein are described and/or illustrated with respect to component 10 (shown in FIG. 10), practice of the assemblies and methods described and/or illustrated herein is not limited to component 10. Rather, the assemblies and methods described and/or illustrated herein are applicable to any component and/or any manufacturing process.

Exemplary embodiments of assemblies and methods are described and/or illustrated herein in detail. The assemblies and methods are not limited to the specific embodiments described herein, but rather, components of each member and components of each assembly, as well as steps of each method, may be utilized independently and separately from other components and steps described herein. Each component, and each method step, can also be used in combination with other components and/or method steps.

When introducing elements/components of the assemblies and methods described and/or illustrated herein, the articles "a", "an", "the" and "said" are intended to mean that there are one or more of the element(s)/component(s). The terms "comprising", "including" and "having" are intended to be inclusive and mean that there may be additional element(s)/component(s) other than the listed element(s)/component(s).

While the invention has been described in terms of various specific embodiments, those skilled in the art will recognize that the invention can be practiced with modification within the spirit and scope of the claims.

What is claimed is:

1. A machine assembly for manufacturing a component, said assembly comprising:

a frame;

a first guide member mounted on said frame;

at least one component support configured to support the component, said at least one component support coupled to said first guide member such that the component is supported below said first guide member when the component is supported by said at least one component support, said at least one component support configured for movement along said first guide member;

a second guide member mounted on said frame;

at least one tool support coupled to said second guide member and configured to support a tool for one of inspecting and machining the component; and a feeder receptacle mounted on said frame, said feeder receptacle configured to contain a plurality of the components, wherein said feeder receptacle is configured to vibrate.

2. A machine assembly in accordance with claim 1 wherein said at least one tool support is coupled to said second guide member such that the tool is supported below said second guide member when the tool is supported by said at least one tool support.

3. A machine assembly in accordance with claim 1 wherein said at least one tool support is configured for movement relative to said at least one component support along said second guide member.

4. A machine assembly in accordance with claim 3 wherein said frame is supported by a support surface, and said at least one tool support is configured for movement along a central longitudinal axis of said second guide member that is generally parallel with the support surface.

5. A machine assembly in accordance with claim 1 wherein a central longitudinal axis of said first guide member is generally perpendicular to a central longitudinal axis of said second guide member.

6. A machine assembly in accordance with claim 1 wherein said frame is supported by a support surface, and said at least one component support is configured for movement along a central longitudinal axis of said first guide member that is generally parallel with the support surface.

7. A machine assembly in accordance with claim 1 further comprising at least one isolator coupled between said frame and at least one of said first guide member and said second guide member, said at least one isolator configured to facilitate vibrationally decoupling said frame from at least one of said first guide member and said second guide member.

8. A machine assembly for manufacturing a component, said assembly comprising:

a frame;

a first guide member mounted on said frame;

at least one component support configured to support the component, said at least one component support coupled to said first guide member such that the component is supported below said first guide member when the component is supported by said at least one component support, said at least one component support configured for movement along said first guide member;

a second guide member mounted on said frame;

at least one tool support coupled to said second guide member and configured to support a tool for one of inspecting and machining the component; and at least one of an inspection tool and a machining tool coupled to said at least one tool support.

9. A method for manufacturing a component using a machine assembly comprising a frame and first and second guide members mounted on the frame, said method comprising:

coupling a component support to the first guide member;

coupling the component to the component support such that the component is supported below the first guide member;

coupling a tool support to the second guide member;

coupling a tool to the tool support; and moving the component support along the first guide member to facilitate manufacturing the component.

10. A method in accordance with claim 9 further comprising moving the tool support relative to the component support along the second guide member to facilitate manufacturing the component.

11. A method in accordance with claim 10 wherein said moving the tool support relative to the component support along the second guide member comprises moving the tool support along a central longitudinal axis of the second guide member that is generally parallel with a surface supporting the frame.

12. A method in accordance with claim 9 wherein said coupling a tool to the tool support comprises coupling the tool to the tool support such that the tool is supported below the second guide member.

13. A method in accordance with claim 9 further comprising one of machining and inspecting the component using the tool.

14. A method in accordance with claim 9 wherein said moving the component support along the first guide member comprises moving the component support along a central longitudinal axis of the first guide member that is generally parallel with a surface supporting the frame.

15. A method in accordance with claim 9 further comprising vibrationally isolating the frame from at least one of the first guide member and the second guide member.

16. A machine assembly for manufacturing a component, said assembly comprising:

a frame;

at least one component support coupled to said frame and configured to support the component;

a support member mounted on said frame;

at least one machining tool support coupled to said support member;

at least one machining tool coupled to said at least one machining tool support;

at least one inspection tool support coupled to said support member; and at least one inspection tool coupled to said at least one inspection tool support, wherein at least one of said at least one machining tool support, said at least one inspection tool support, and said at least one component support configured for movement to facilitate manufacturing the component.

17. A machine assembly in accordance with claim 16 wherein said support member comprises a guide, and at least one of said at least one machining tool support and said at least one inspection tool support is configured for movement along said guide to facilitate manufacturing the component.

* * * * *